March 31, 1964  J. RICHTER ETAL  3,127,004
POSITIONING DEVICE FOR THE ELEMENTS OF AN
INTERMITTENTLY MOVING CONVEYOR
Filed Dec. 27, 1961

INVENTORS
Jiří Richter, Karel
Černoch

BY

United States Patent Office 3,127,004
Patented Mar. 31, 1964

3,127,004
POSITIONING DEVICE FOR THE ELEMENTS OF AN INTERMITTENTLY MOVING CONVEYOR
Jiří Richter and Karel Cernoch, Gottwaldov, Czechoslovakia, assignors to Svit, narodni podnik, Gottwaldov, Czechoslovakia
Filed Dec. 27, 1961, Ser. No. 162,515
Claims priority, application Czechoslovakia Dec. 29, 1960
4 Claims. (Cl. 198—135)

This invention relates to intermittently moving conveyors of the type employed in assembly operations and other manufacturing operations, and more particularly to a device for precisely positioning the movable elements of the conveyor relative to its fixed elements after each conveyor movement.

It is common practice to move work pieces along a row of work stations on a conveyor, the pieces being worked upon at the stations. While certain manufacturing processes permit continuous movement of the conveyor, others require a stepwise indexing movement of the conveyor, work being done on the work pieces while the conveyor stands still. The position in which the work pieces are presented at the work station is not critical where work is to be done manually or where automatically performed operations do not require precise alignment of a work piece and of a tool.

The manufacture of shoes by automatic conveyorized equipment includes manufacturing steps which require precise positioning of a work piece relative to tools, particularly in finishing operations on the edges of the soles or on the heels. While this invention will be described hereinafter in its application to the automatized manufacture of shoes, it will be understood that it is not limited to any particular industry, to any specific type of work piece, nor to specific operations which are to be performed at the work stations.

The primary object of this invention is the provision of means for precisely aligning a movable belt element of a conveyor with a fixed conveyor element after each indexing movement of the conveyor.

With this object and other objects in view, this invention in one of its aspects contemplates tensioning a conveyor belt in a longitudinal direction by resilient means. Engageable abutment means are mounted on the conveyor belt and on the support frame of the conveyor. A positioning drive moves the abutment means on the support frame longitudinally of the belt toward and away from a predetermined position. During movement toward this position the abutment means on the frame engage the abutment means on the belt and move them in the direction opposite to the direction of belt tensioning by the aforementioned resilient means. The indexing drive of the conveyor is inoperative during the positioning movement.

Other features of this invention and many of the attendant advantages thereof will be readily appreciated as the same becomes better understood by reference to the following detailed description of a preferred embodiment when considered in connection with the accompanying drawing wherein.

Figure 3:
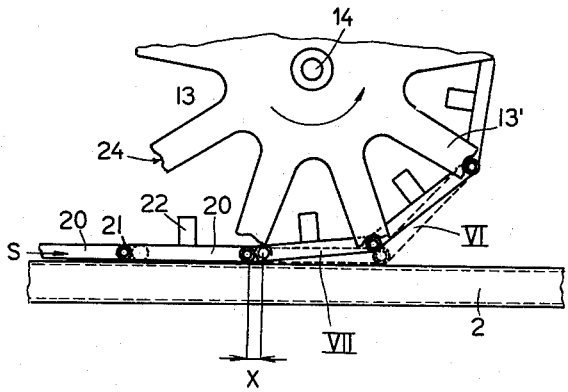
FIG. 3 illustrates a detail of the conveyor of FIG. 1, including elements of the indexing drive, substantially on the scale of FIG. 2.

Referring now to the drawing in detail, there is shown an indexing conveyor of an automatized shoe manufacturing plant, the plant itself and its automatic machines not being shown in detail since they do not form part of this invention.

Figure 1:
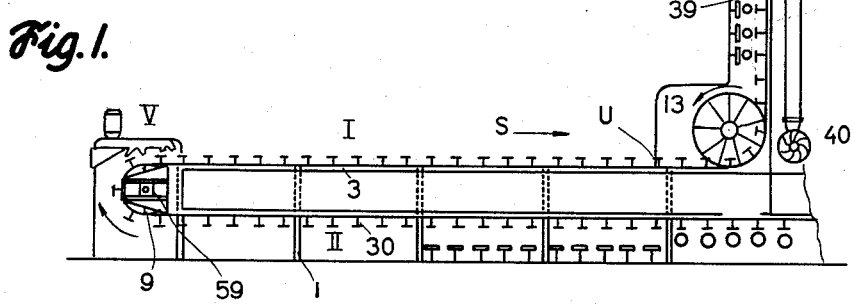
FIG. 1 is a fragmentary side-elevational view of a belt conveyor equipped with the positioning device of the invention.

The conveyor has a support frame 1 on which a belt constituted by individual links 20 is movable in a closed, continuous path. Only a portion of this path is seen in the drawing. The portion of the conveyor belt illustrated in FIG. 1, consists of a horizontal run I which will be understood to pass along a plurality of work stations, not themselves shown. From these work stations the belt is led into a vertical path III which extends within a partly illustrated oven 37 equipped with infra-red heaters 38 and electrical radiant heating devices 39 and with an exhaust fan 40. The conveyor belt returns from the oven 37 to the work stations of the horizontal run I in a horizontal path II.

The belt is driven and guided by sprocket wheels and idlers. A driven star wheel 13 at the entrance of the oven 37 serves to actuate movement of the belt in the direction of the arrow S, and to change its direction of movement by 90°. An idler 17 in the oven reverses the direction of belt movement, and an idler 9 which engages the arcuate belt portion V between the horizontal runs I and II of the belt is provided for the same purpose. While the wheel 13 and the idler 17 are mounted in fixed bearings on the support frame 1, the shaft of the idler 9 is journaled in bearings urged by compression springs 59 to move in a direction away from the belt runs I and II so as to tension the belt.

The belt consists of a plurality of identical links 20 having the shape of approximately rectangular plates. Successive belt links are hingedly connected by transverse pins 19. Each pin 19 projects beyond the two lateral edges of the belt and carries the inner races of two ball bearings 21, 21' on its projecting terminal portions. The outer races of the ball bearings constitute rollers by means of which the belt is movably supported on tracks 3 fixedly secured to channels 2, 2' which are elements of the support frame 1 and extend along the path of the belt.

Each link 20 of the conveyor belt is equipped with a centrally mounted last carrier 22 the top face 23 of which is provided with a projection and a recess for locking engagement with a removable last 30 on which a shoe may be carried past the several work stations by the conveyor belt.

The conveyor belt is driven by engagement of the star wheel 13 with the ball bearing rollers 21, and of a coaxially mounted second star wheel, identical with wheel 13, but not visible in the drawing, with the rollers 21' in the manner best seen in FIG. 3. Each star wheel has nine arms 13' equiangularly spaced about the driven shaft 14 on which the star wheels are fixedly mounted. The circumferential face of each arm 13' has a notch 24 which conformingly engages a roller 21, 21'. The spacing of the notches 24 is equal to the spacing of the rollers, and the shaft 14 is connected to the main drive of the machine in such a manner that it moves the conveyor belt in steps equal in length to the spacing of longitudinally successive pins 19. The motion transmitting mechanism which provides indexing movement of the shaft 14 during continuous rotation of the main drive may include a Geneva movement or any one of the well known equivalents of such a movement.

It is difficult to build an indexing drive suitable for precise alignment between the belt links 20 and the work stations, and it is impractical to maintain a production conveyor in a condition which would permit precise alignment to be provided by the indexing drive alone over an extended period of operation involving wear of parts. Additional elements of misalignment are introduced by differential thermal expansion of parts which is virtually impossible to compensate for in an adequate manner when the conveyor passes through an oven as in the embodiment illustrated in the drawing.

Precise alignment between the individual conveyor links 20 and the non-illustrated work stations fixedly arranged along the conveyor run I is ensured by the positioning device illustrated in the drawing to be located at U adjacent the entrance of the oven 37 and the star wheel 13.

The positioning device illustrated is driven by a shaft 65 which is journaled in bearings 4, 5 on the frame 1. It is connected to the main conveyor drive by a spur gear 62 which rotates continuously in the direction of the arrow. The axis of the shaft 65 is parallel to the direction of elongation of the conveyor belt and it will be appreciated that the same shaft may actuate additional devices.

A disc 7 is fastened on the shaft 65 and carries a cam track 8 which has a major elevated portion and a minor depressed portion. The transmission ratio of the connections between the main conveyor drive, the shaft 14 and the shaft 65 is such that the shaft 14 is indexed once during each revolution of the shaft 65, and that the indexing movement of the shaft 14 requires that fraction of the period of revolution of the shaft 65 which is represented by the depressed cam track portion. The elevated and depressed portions of the cam track 8 are connected by short inclined ramps.

The cam track 8 cooperates with a cam follower roller 27 rotatable on a pin 16 and urged into engagement with the track by a helical tension spring 28 fastened to a lug 29 on the frame 1. The pin 16 is eccentrically fastened on a crank arm 25 secured to one end of a shaft 15 which is journaled in fixed bearings 11, 12, and has an axis transverse of the conveyor belt. The other end of the shaft 15 carries a crank arm 26 identical with the arm 25. The free ends of the arms 25, 26 carry respective pivot pins 31, 32 on which detents 33, 34 are freely rotatable above the track 3. The free ends of the detents 33, 34 are urged into contact with the tops of the links 20 by gravity, and are raised temporarily when the rollers 21, 21' pass under them.

Figure 2:
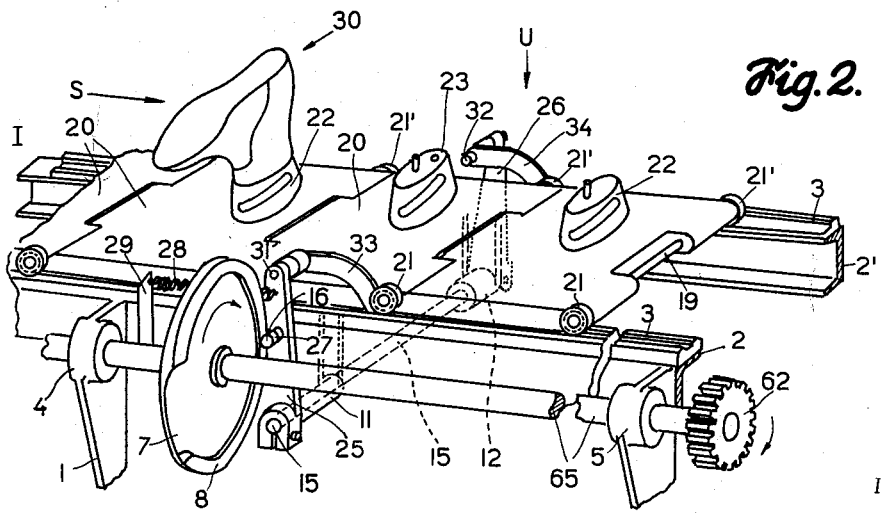
FIG. 2 shows the positioning device of the conveyor of FIG. 1 in a perspective view on an enlarged scale.

The aforedescribed apparatus operates as follows:

During the indexing movement of the conveyor, the cam follower roller 27 moves over the depressed portion of the cam track 8 and the detents 33, 34 are held by the spring 28 in a position which is displaced from that illustrated in FIG. 2 contrary to the direction of conveyor travel. When the indexing step of the conveyor is completed, the roller 27 rides over a ramp to the elevated portion of the cam track, and the detents 33, 34 are thereby moved longitudinally of the conveyor belt in the direction of the arrows S into the illustrated position. The cam disc 7 is mounted on the shaft 65 in such an angular position that the detents 33, 34 abut against the rollers 21, 21' and forcibly advance them to the position shown in FIG. 2 immediately after completion of an indexing step.

It will be remembered that the belt is resiliently tightened by the springs 59. The advance of the rollers 21, 21' is opposed by the springs 59, and the springs are compressed as far as necessary to permit the movement of the belt actuated by the abutment of the detents 33, 34 against the rollers 21, 21'. Since the position of the detents longitudinally of the belt is precisely determined at all times, the position of the abuttingly engaged rollers 21, 21' is determined with equal precision while the cam follower 27 is in contact with the elevated portion of the cam track 8.

As best seen from FIG. 3, the forward movement of the belt by the detents 33, 34 loosens the engagement of the belt portion VII with the star wheel 13 over which it is trained, and the belt assumes the position VI indicated by broken lines, when the detents 33, 34 advance the engaged rollers 21, 21' by the distance $x$. However, not all belt links 20 trained over the wheel 13 are released, and the frictional forces in the power transmission system hold the wheel 13 in its position against the combined forces of the detents 33, 34 and of the springs 59 which tend to turn wheel 13 counterclockwise as viewed in FIG. 3, in its normal direction of rotation.

When the cam follower 27 reaches the end of the elevated portion of the cam track 8, the detents 33, 34 are withdrawn toward their initial position. The tension in the conveyor belt run I is relaxed, and the belt is tightened about the star wheel 13 as shown in fully drawn lines at VII in FIG. 3. The next indexing movement is simultaneously started by rotation of the shaft 14. The next pair of rollers 21, 21' moves past the detents 33, 34, thereby temporarily pivoting the detents upward about the respective pins 31, 32. When the shaft 14 stops again, the detents are positioned somewhat behind the rollers 33, 34 which just passed them, and are ready for abutting engagement with these rollers during the ensuing forward stroke of the crank arms 25, 26 when the next cycle of operations begins.

While the conveyor is stationary and the individual links 20 of the belt run I are in precisely defined positions, automatic machinery mounted in fixed locations along the horizontal run I of the conveyor may process the shoes on lasts 30. Examples of suitable automatic machinery have been disclosed in the commonly assigned copending application serial number.

As many individual work stations may be arranged along the conveyor run as there are links in the conveyor, but the work stations are preferably spaced from each other by integral multiples of the effective length of each link if identical links are employed. Only a relatively short portion of the conveyor length separates the several work stations along the run I, and precisely positioning one link is adequate to properly positioning all links located between the spring loaded idler 9 and the location U of the positioning device.

While a cam actuated pair of mechanical detents has been described in connection with a preferred embodiment of the invention, it will be apparent to those skilled in the art, that the detents may be replaced by pneumatically or hydraulically actuated abutments which cooperate with the rollers 21, 21' or any other abutment means fixed on the conveyor belt.

The movable elements of the conveyor need not constitute a belt of rigid links, and the positioning device of the invention can be adapted to chain belts, endless bucket or platform conveyors, and other conventional conveyor forms, and such endless conveyors will be understood to be included in the term belt means as employed in the annexed claims regardless of the actual configuration of the movable conveyor elements. Other modifications not requiring inventive faculty will readily suggest themselves.

It should be understood, therefore, that the foregoing disclosure relates to only a preferred embodiment of the invention, and that it is intended to cover all changes and modifications of the example of the invention herein chosen for the purpose of the disclosure which do not constitute departures from the spirit and scope of the invention set forth in the appended claims.

What I claim is:
1. In a conveyor, in combination,
   (a) a support;
   (b) elongated conveyor belt means on said support;
   (c) resilient means on said support for tensioning said belt means in a predetermined longitudinal direction;
   (d) indexing drive means intermittently operative for longitudinally moving said belt means;
   (e) first abutment means fixedly mounted on said belt means;
   (f) second abutment means on said support and engageable with said first abutment means; and
   (g) positioning drive means for moving said second abutment means longitudinally of said belt means toward and away from a predetermined position, said second abutment means during movement toward said position engaging said first abutment means for movement thereof in a direction opposite to said predetermined direction while said indexing drive means is inoperative.

2. In a conveyor, in combination,
   (a) a support;
   (b) elongated conveyor belt means on said support;
   (c) a plurality of work carriers longitudinally spaced on said belt means;
   (d) resilient means on said support for tensioning said belt means in a predetermined longitudinal direction;
   (e) indexing drive means intermittently operative for longitudinally moving said belt means in indexing steps corresponding to the spacing of said work carriers;
   (f) a plurality of first abutment means fixedly mounted on said belt means in substantially identical spatial relationship to respective ones of said work carriers;
   (g) second abutment means on said support and sequentially engageable with said plurality of first abutment means after respective indexing steps of said belt means; and
   (h) positioning drive means for moving said second abutment means longitudinally of said belt means toward and away from a predetermined position, said second abutment means during movement toward said position engaging one of said first abutment means for movement of said one abutment means in a direction opposite to said predetermined direction while said indexing drive means is inoperative.

3. In a conveyor as set forth in claim 2,
   said positioning drive means including rotary cam means, cam follower means engaging said cam means for reciprocating movement of said cam follower means when said cam means rotates, and motion transmitting means connected to said cam follower means and to said second abutment means for moving the same toward and away from said predetermined position when said cam means rotates.

4. In a conveyor as set forth in claim 2,
   each of said first and second abutment means including two abutment members spaced transversely of the direction of elongation of said belt means.

References Cited in the file of this patent
UNITED STATES PATENTS

| | | |
|---|---|---|
| 636,534 | Krone | Nov. 7, 1899 |
| 2,908,378 | Brown | Oct. 13, 1959 |